United States Patent
Jeong et al.

(10) Patent No.: US 12,434,139 B2
(45) Date of Patent: Oct. 7, 2025

(54) ELECTRONIC APPARATUS AND CONTROL METHOD THEREOF

(71) Applicant: SAMSUNG ELECTRONICS CO., LTD., Suwon-si (KR)

(72) Inventors: Younghoon Jeong, Suwon-si (KR); Daeeun Kim, Suwon-si (KR); Taejun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 18/072,097

(22) Filed: Nov. 30, 2022

(65) Prior Publication Data

US 2023/0109358 A1     Apr. 6, 2023

Related U.S. Application Data

(63) Continuation of application No. PCT/KR2022/010878, filed on Jul. 25, 2022.

(30) Foreign Application Priority Data

Oct. 5, 2021  (KR) .................. 10-2021-0131666

(51) Int. Cl.
   *A63F 13/55*   (2014.01)
   *A63F 13/355*   (2014.01)
   (Continued)

(52) U.S. Cl.
   CPC ............ *A63F 13/355* (2014.09); *A63F 13/52* (2014.09); *G06T 5/60* (2024.01); *G06T 2200/16* (2013.01);
   (Continued)

(58) Field of Classification Search
   CPC .......... A63F 13/40; A63F 13/44; A63F 13/52; G09G 2340/14; G09G 2340/0435; G09G 2320/08
   See application file for complete search history.

(56) References Cited

U.S. PATENT DOCUMENTS

5,473,595 A * 12/1995 Hayashi ............. G06F 13/4022
                                                     369/124.09
6,636,214 B1 * 10/2003 Leather ................... G06T 15/40
                                                     345/506
(Continued)

FOREIGN PATENT DOCUMENTS

EP      3 152 910            4/2017
JP      2002229886 A  *   8/2002
(Continued)

OTHER PUBLICATIONS

Communication issued Jul. 18, 2024 by the European Patent Office in European Patent Application No. 22878684.4.
(Continued)

*Primary Examiner* — Steven J Hylinski
(74) *Attorney, Agent, or Firm* — Sughrue Mion, PLLC

(57) ABSTRACT

An electronic apparatus is provided. The electronic apparatus includes: a communication interface; a user interface; and a processor configured to control the electronic apparatus to: receive a content and metadata corresponding to the content from a server through the communication interface; obtain an input lag allowance time corresponding to the content based on any one or any combination of image information corresponding to the content, the metadata, or a pattern of a user command received through the user interface; identify at least one image processing method, among a plurality of image processing methods, based on the input
(Continued)

lag allowance time; and perform image processing on the content based on the at least one image processing method.

24 Claims, 10 Drawing Sheets

(51) Int. Cl.
*A63F 13/52* (2014.01)
*G06T 5/60* (2024.01)
*H04L 43/0852* (2022.01)
*H04L 43/16* (2022.01)

(52) U.S. Cl.
CPC ...... *G06T 2200/24* (2013.01); *H04L 43/0852* (2013.01); *H04L 43/16* (2013.01)

(56) References Cited

U.S. PATENT DOCUMENTS

| | | | |
|---|---|---|---|
| 6,665,872 B1 * | 12/2003 | Krishnamurthy | H04N 19/159 375/E7.218 |
| 8,698,812 B2 | 4/2014 | Gallway et al. | |
| 9,086,995 B2 | 7/2015 | Colenbrander | |
| 10,376,786 B2 | 8/2019 | Lee et al. | |
| 10,616,086 B2 | 4/2020 | Tamasi et al. | |
| 10,681,345 B2 | 6/2020 | Kang et al. | |
| 10,828,561 B2 | 11/2020 | Lee | |
| 11,297,355 B1 | 4/2022 | Wei et al. | |
| 2003/0161398 A1 * | 8/2003 | Feder | H04N 21/8153 375/E7.091 |
| 2007/0192509 A1 * | 8/2007 | Ohtsuka | H04N 1/42 709/246 |
| 2008/0088635 A1 * | 4/2008 | Callway | H04N 5/46 348/E5.062 |
| 2008/0117329 A1 * | 5/2008 | Wyman | H04N 7/012 348/E7.003 |
| 2008/0211963 A1 | 9/2008 | Vanderheijden et al. | |
| 2009/0287841 A1 * | 11/2009 | Chapweske | H04L 65/752 709/234 |
| 2010/0304860 A1 * | 12/2010 | Gault | A63F 13/30 463/31 |
| 2011/0246657 A1 * | 10/2011 | Glow | H04L 65/611 709/234 |
| 2012/0224105 A1 * | 9/2012 | Horikoshi | G09G 5/005 348/E9.037 |
| 2014/0189091 A1 | 7/2014 | Tamasi et al. | |
| 2015/0286753 A1 * | 10/2015 | Kurkure | G06F 11/3419 703/22 |
| 2019/0052873 A1 | 2/2019 | Kang et al. | |

FOREIGN PATENT DOCUMENTS

| | | |
|---|---|---|
| JP | 2007219626 A * | 8/2007 |
| JP | 2013-48446 A | 3/2013 |
| JP | 2014-211808 A | 11/2014 |
| JP | 5688555 B2 | 3/2015 |
| JP | 2021-94086 A | 6/2021 |
| KR | 10-2007-0006493 A | 1/2007 |
| KR | 10-2017-0076478 A | 7/2017 |
| KR | 10-2017-0100079 A | 9/2017 |
| KR | 10-2019-0016306 A | 2/2019 |
| WO | 2015/185426 A1 | 12/2015 |

OTHER PUBLICATIONS

Active Video, "Cloud UIs Managing Latency without Compromise", Nov. 11, 2013, XP055443472. (8 pages total).

Communication dated Nov. 2, 2022, issued by the International Searching Authority in counterpart International Application No. PCT/KR2022/010878 (PCT/ISA/210).

Communication dated Nov. 2, 2022, issued by the International Searching Authority in counterpart International Application No. PCT/KR2022/010878 (PCT/ISA/237).

* cited by examiner

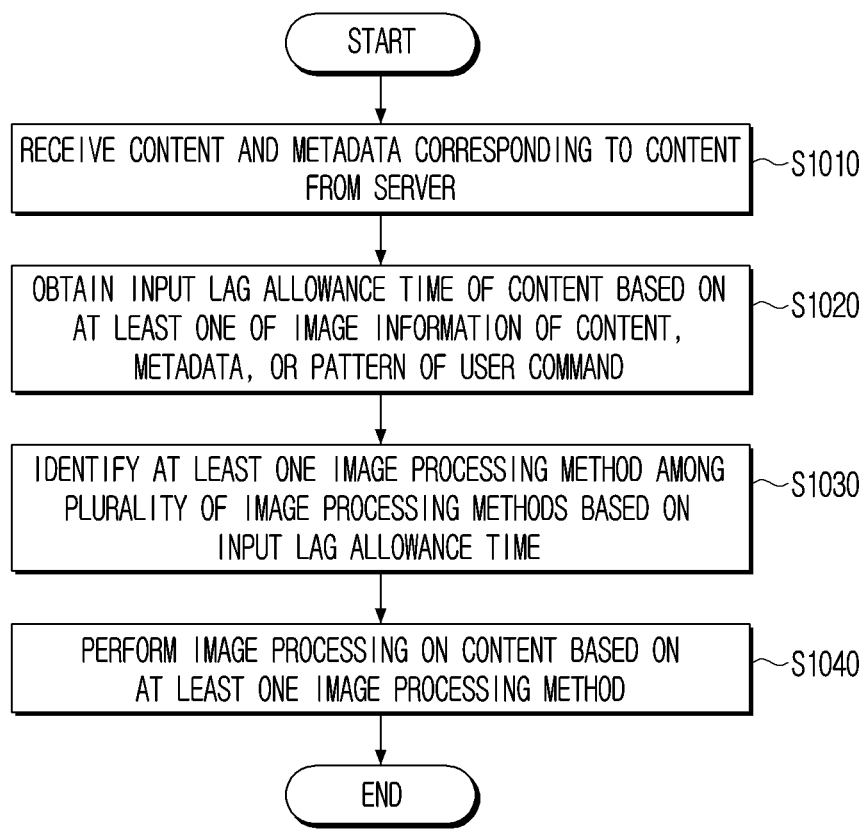

ELECTRONIC APPARATUS AND CONTROL METHOD THEREOF

CROSS-REFERENCE TO RELATED APPLICATION(S)

This application is a bypass continuation of International Application No. PCT/KR2022/010878, filed on Jul. 25, 2022, which is based on and claims priority to Korean Patent Application No. 10-2021-0131666, filed on Oct. 5, 2021, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus that performs image processing on a content and a control method thereof.

The disclosure further relates to an artificial intelligence (AI) system simulating functions of the human brain such as recognition or determination using a machine learning algorithm, and an application thereof.

2. Description of Related Art

Recently, game services based on a cloud server, instead of a console or a personal computer (PC), are distributed. Specifically, a server generates a game content through its own graphics processing unit (GPU) and transmits the generated game content to a display apparatus not necessarily including a high-performance GPU, such as a television (TV) set, a smartphone, a tablet PC, or the like. Accordingly, games with high definition and high complexity are able to be played on small-sized display apparatuses.

Input lag is an important matter when playing games with high definition and high complexity. The input lag refers to a delay occurring in a process in which a value input to an input device is reflected in output of an output device, and may be caused by a flow of information from an input device (e.g., a keyboard/mouse), to a computer, to a display device (e.g., a monitor/television).

Therefore, a method is needed for providing optimal image quality while considering the input lag. Particularly, it is necessary to develop a method for processing low-latency screen display in a cloud game service streamed by compressing game scenes.

SUMMARY

Embodiments of the disclosure provide an electronic apparatus which performs processing for low-latency screen display in a cloud game service and a control method thereof.

In accordance with an aspect of the disclosure, an electronic apparatus includes: a communication interface; a user interface; and a processor configured to control the electronic apparatus to: receive a content and metadata corresponding to the content from a server through the communication interface; obtain an input lag allowance time corresponding to the content based on any one or any combination of image information corresponding to the content, the metadata, or a pattern of a user command received through the user interface; identify at least one image processing method, among a plurality of image processing methods, based on the input lag allowance time; and perform image processing on the content based on the at least one image processing method.

The processor may be further configured to identify the at least one image processing method based on whether the input lag allowance time is exceeded by a combination of a manipulation time of the user interface, a communication time between the electronic apparatus and the server, a decoding time of the content, and a display output time.

The processor may be further configured to identify the at least one image processing method based on a plurality of priorities corresponding to the plurality of image processing methods, respectively, or an estimated processing time of each of the plurality of image processing methods.

The image information may include any one or any combination of scene change information of the content, scene difference information, scene quality information, or motion information of an object included in the content.

The processor may be further configured to: obtain a plurality of input lag allowance times for each of a plurality of scenes of the content, respectively; identify at least one image processing method among the plurality of image processing methods for each of the plurality of scenes, respectively, based on a corresponding input lag allowance time among the plurality of input lag allowance times; and perform image processing on each of the plurality of scenes based on a corresponding at least one identified image processing method.

The electronic apparatus may further include a memory storing a neural network model. The processor may be further configured to obtain the input lag allowance time of the content by inputting the content, the metadata, and the pattern of the user command to the neural network model. The neural network model may be a model trained based on a plurality of sample contents, a plurality of sample metadata corresponding to the plurality of sample contents, and a relationship between a sample pattern of a plurality of sample user commands and a plurality of input lag allowance times corresponding to the plurality of sample contents.

The processor may be further configured to: based on a mode of the electronic apparatus being a first mode, perform image processing on the content based on each of the plurality of image processing methods; based on the mode of the electronic apparatus being a second mode, perform the image processing on the content based on the at least one image processing method; and based on the mode of the electronic apparatus being a third mode, not perform the image processing on the content.

The content may be an encoded content. The processor may be further configured to: decode the encoded content; and obtain the input lag allowance time of the decoded content based on a decoding time and any one or any combination of the image information corresponding to the content, the metadata, or the pattern of the user command.

The processor may be further configured to: implement at least one module including any one or any combination of a definition improvement module, a noise reduction module, a contrast ratio improvement module, a frame rate improvement module, or a color processing module; and perform the image processing on the content using the at least one module.

The plurality of image processing methods may include any one or any combination of definition improvement, noise reduction, contrast ratio improvement, frame rate improvement, or color processing.

The pattern of the user command may include any one or any combination of an input time interval of the user command or a type of the user command.

In accordance with an aspect of the disclosure, a method for controlling an electronic apparatus includes: receiving a content and metadata corresponding to the content from a server; obtaining an input lag allowance time corresponding to the content based on any one or any combination of image information corresponding to the content, the metadata, or a pattern of a user command; identifying at least one image processing method, among a plurality of image processing methods, based on the input lag allowance time; and performing image processing on the content based on the at least one image processing method.

The identifying may include identifying the at least one image processing method based on whether the input lag allowance time is exceeded by a combination of a manipulation time of a user interface included in the electronic apparatus, a communication time between the electronic apparatus and the server, a decoding time of the content, and a display output time.

The identifying may include identifying the at least one image processing method based on a plurality of priorities corresponding to the plurality of image processing methods, respectively, or an estimated processing time of each of the plurality of image processing methods.

The image information may include any one or any combination of scene change information of the content, scene difference information, scene quality information, or motion information of an object included in the content.

In accordance with an aspect of the disclosure, a non-transitory computer readable storage medium having instructions stored thereon which, when executed by a processor of a display device including a communication interface and a user interface, cause the display device to: receive a content and metadata corresponding to the content from a server through the communication interface; obtain an input lag allowance time corresponding to the content based on any one or any combination of image information corresponding to the content, the metadata, or a pattern of a user command received through the user interface; identify at least one image processing method, among a plurality of image processing methods, based on the input lag allowance time; and perform image processing on the content based on the at least one image processing method.

In accordance with an aspect of the disclosure, a display device includes: a display panel; a communication interface; and a processor configured to: receive content through the communication interface; obtain an input lag allowance time corresponding to the content; identify at least one image processing method, among a plurality of image processing methods, based on the input lag allowance time; perform image processing on the content based on the at least one image processing method to obtain processed image data; and control the display panel based on the processed image data.

An image processing method, among the plurality of image processing methods, may be excluded from the at least one image processing method.

A number of the at least one image processing method may be less than a number of the plurality of image processing methods.

The display device may further include a user interface configured to receive input. The processor may be further configured to: identify a pattern of the input received through the user interface; and obtain the input lag allowance time based on the pattern.

The processor may be further configured to obtain the input lag allowance time based on the pattern and metadata corresponding to the content.

The processor may be further configured to control the communication interface to transmit commands to an external device based on the input. The content received through the communication interface may be provided by the external device based on the input.

The processor may be further configured to identify the at least one image processing method based on the input lag allowance time and a response time corresponding to a difference between an input time when a first input is provided to the user interface, and an output time when content corresponding to the first input is displayed as the processed image data.

The external device may be a cloud based game server, and the content may correspond to a game provided by the cloud based game server.

According to various embodiments of the disclosure, the electronic apparatus may obtain the input lag allowance time and apply at least one image processing method of the plurality of image processing methods to the content based on the input lag allowance time, thereby providing optimal image quality while minimizing input lag.

In addition, the electronic apparatus may identify at least one image processing method in consideration of the data transmission and reception time with the server, thereby providing optimal image quality while minimizing input lag even in a cloud game service.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 10 is a diagram illustrating a method for controlling an electronic apparatus according to an embodiment.

DETAILED DESCRIPTION

Figure 1:
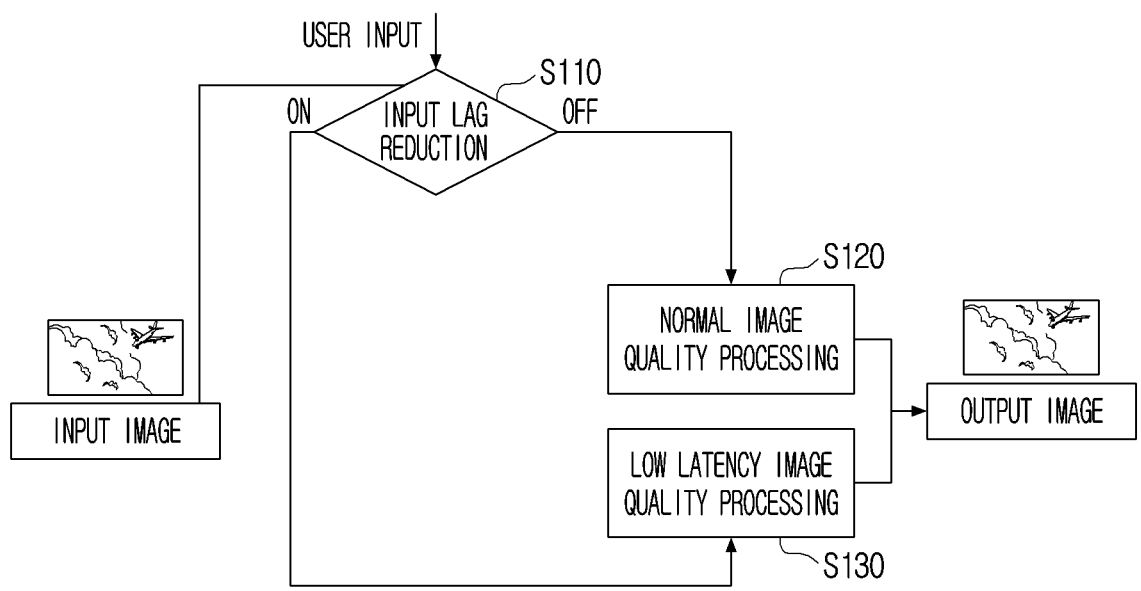
FIG. 1 is a diagram illustrating a method for controlling an electronic apparatus.

The embodiments of the present disclosure may be diversely modified. Accordingly, specific embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions are not described in detail since they would obscure the disclosure with unnecessary detail.

Hereinafter, embodiments will be described in detail with reference to the accompanying drawings.

The terms used herein have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Accordingly, the terms used in the description should not necessarily be construed as simple names of the terms, but be defined based on meanings of the terms and overall contents of the present disclosure.

In the description, the term "has", "may have", "includes" or "may include" indicates existence of a corresponding feature (e.g., a numerical value, a function, an operation, or a constituent element such as a component), but does not exclude existence of an additional feature.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

As used herein, the terms "1st" or "first" and "2nd" or "second" may use corresponding components regardless of importance or order and are used to distinguish a component from another component without limiting the components.

Singular forms are intended to include plural forms unless the context clearly indicates otherwise. The terms "include", "comprise", "is configured to," etc., of the description are used to indicate that there are features, numbers, steps, operations, elements, parts or a combination thereof, and they should not exclude the possibilities of combination or addition of one or more features, numbers, steps, operations, elements, parts or a combination thereof.

Also, the term "user" may refer to a person who uses an electronic apparatus or an apparatus (e.g., an artificial intelligence electronic apparatus) that uses the electronic apparatus.

FIG. 1 is a diagram illustrating a method for controlling an electronic apparatus. As shown in FIG. 1, image quality processing can be performed in a normal mode of performing normal image quality processing or a game mode of performing low-latency image quality process according to a user input.

In operation S110, a user input is received. If the user input indicates input lag reduction is off in operation S110, normal image quality processing is performed, in operation S120, on an input image to obtain an output image. If the user input indicates input lag reduction is on in operation S110, low latency image quality processing is performed, in operation S130, on the input image to obtain the output image.

According to another method, a natural image without judder may be output by performing frame rate conversion, when an input image is identified as a movie, and outputting an image by minimizing latency without the frame rate conversion, when the input image is identified as a game.

According to yet another method, movement of an object included in an image and depth of the image may be analyzed to determine a genre of a game. A display setting may be changed according to the genre.

According to still another method, a video signal and an audio signal of a content may be analyzed for different scenes of the content. Video settings, including a black equalizer function, a contrast ratio function and a color chroma function, as well as audio settings, including generating sense of altitude and enlarging a stage or a sound equalizer function, may be controlled for each scene based on the analysis.

However, these methods do not provide optimal image quality in consideration of input lag.

Figure 2:
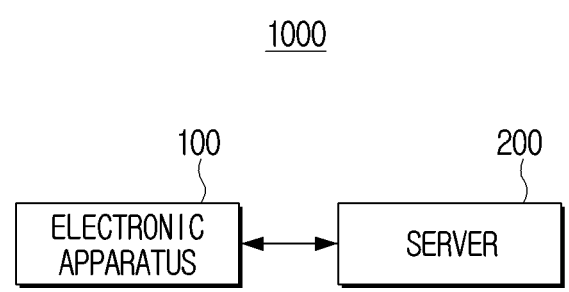
FIG. 2 is a block diagram illustrating a configuration of an electronic system according to an embodiment.

FIG. 2 is a block diagram illustrating a configuration of an electronic system 1000 according to an embodiment. As illustrated in FIG. 2, the electronic system 1000 includes an electronic apparatus 100 and a server 200.

The electronic apparatus 100 is an apparatus for receiving a content from the server 200 and may be a set-top box (STB), a desktop PC, a laptop, a smartphone, a tablet PC, a server, a TV, or the like. Particularly, the electronic apparatus 100 may include a display and display an image-processed content. However, embodiments are not limited thereto, and the electronic apparatus 100 may be any apparatus able to perform image processing on a content.

Alternatively, the electronic apparatus 100 may be an apparatus for receiving a content and metadata corresponding to the content from the server 200. However, embodiments are not limited thereto, and the electronic apparatus 100 may receive a content including metadata from the server 200.

The electronic apparatus 100 may receive an encoded content from the server 200 and decode the encoded content. Alternatively, the electronic apparatus 100 may receive an encoded content and metadata corresponding to the encoded content from the server 200, and decode the encoded content. However, embodiments are not limited thereto, and the electronic apparatus 100 may receive the encoded content including metadata from the server 200.

The server 200 may communicate with the electronic apparatus 100. For example, the server 200 is an apparatus for transmitting a content to the electronic apparatus 100 and may be a desktop PC, a laptop, a smartphone, a tablet PC, or the like. However, embodiments are not limited thereto, and the server 200 may be any apparatus, as long as it is able to transmit the content to the electronic apparatus 100.

In addition, the server 200 may generate a content, encode the generated content, and transmit the encoded content to the electronic apparatus 100.

Hereinabove, the operations of the electronic apparatus 100 and the server 200 included in the electronic system 1000 have been briefly described. Hereinafter, an image processing method of the content will be described in detail mainly based on the operations of the electronic apparatus 100.

Figure 3:
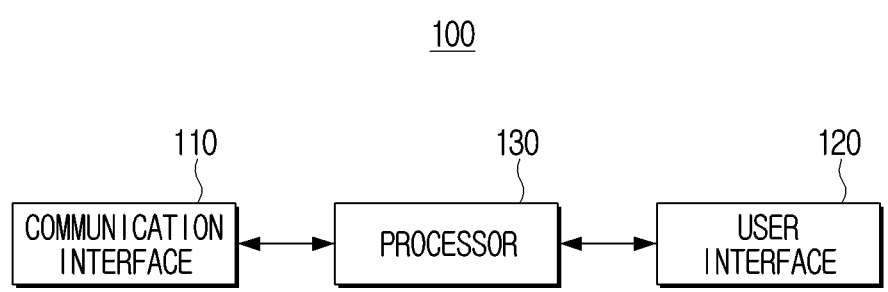
FIGS. 3 and 4 are a block diagrams illustrating a configuration of an electronic apparatus according to an embodiment.

FIG. 3 is a block diagram illustrating a configuration of the electronic apparatus 100 according to an embodiment.

Referring to FIG. 3, the electronic apparatus 100 may include a communication interface 110, a user interface 120, and a processor 130.

The communication interface 110 may be configured to communicate with various types of external apparatuses according to various types of communication methods. For example, the electronic apparatus 100 may communicate with the server 200 through the communication interface 110.

The communication interface 110 may include a Wi-Fi module, a Bluetooth module, an infrared communication module, a wireless communication module, and the like. Each communication module may be implemented as at least one hardware chip.

The Wi-Fi module and the Bluetooth module may communicate by a Wi-Fi method and a Bluetooth method, respectively. In a case of using the Wi-Fi module or the Bluetooth module, various pieces of connection information such as service set identifier (SSID) or session key may be transmitted or received first to establish the communication connection, and then various pieces of information may be transmitted and received using the established connection. The infrared communication module may perform communication according to a technology of infrared communication (e.g., infrared Data Association (IrDA)) for transmitting data in a close range wirelessly by using infrared rays that have a wavelength between visible rays and millimeter waves.

Additionally, the wireless communication module may include at least one communication chip for performing communication according to various wireless communication standard such as ZigBee, 3rd Generation (3G), 3rd Generation Partnership Project (3GPP), Long Term Evolution (LTE), LTE Advanced (LTE-A), 4th Generation (4G), 5th Generation (5G), and the like.

The communication interface 110 may include a wired communication interface such as High-Definition Multimedia Interface (HDMI), DisplayPort (DP), Thunderbolt, Universal Serial Bus (USB), RGB interface, D-subminiature (D-SUB), Digital Visual Interface (DVI), or the like.

In addition, the communication interface 110 may include at least one of wired communication modules for performing communication by using a local area network (LAN) module, an Ethernet module, pair cables, a coaxial cable, an optical fiber cable, or an ultra-wide-band (UWB) module.

The user interface 120 may be implemented as a button, a touch pad, a mouse, and a keyboard, and may also be implemented as a touch screen capable of performing the display function and the manipulation input function. The button may be various types of buttons such as a mechanical button, a touch pad, or a wheel formed in any region of a front portion, a side portion, or a rear portion of the appearance of the main body of the electronic apparatus 100.

The processor 130 may generally control the operation of the electronic apparatus 100. Specifically, the processor 130 may be connected to each element of the electronic apparatus 100 to generally control the operation of the electronic apparatus 100. For example, the processor 130 may be connected to and control the elements such as the communication interface 110, the user interface 120, and the like to control the operation of the electronic apparatus 100.

According to an embodiment, the processor 130 may be implemented as a digital signal processor (DSP), a microprocessor, or a time controller (TCON) for processing digital signals. However, embodiments are not limited thereto, and the processor 130 may include one or more of a central processing unit (CPU), a microcontroller unit (MCU), a microprocessing unit (MPU), a controller, an application processor (AP), a communication processor (CP), and an ARM processor. In addition, the processor 130 may be implemented as System on Chip (SoC) or large scale integration (LSI) including the processing algorithm or may be implemented in form of a field programmable gate array (FPGA).

The processor 130 may receive a content and metadata corresponding to the content from the server 200 through the communication interface 110, and obtain an input lag allowance time of the content based on at least one of image information of the content, metadata, or a pattern of a user command received through the user interface 120. Herein, the image information may include at least one of scene change information, scene difference information, scene quality information of the content, or motion information of an object included in the content. In addition, the metadata may include at least one of a title or a genre of the content. The pattern of the user command may include at least one of an input time interval of the user command or a type of the user command. The input time interval may indicate a time between consecutive user commands. The processor 130 may compare the input time interval with a time interval threshold. The processor 130 may determine the input lag allowance time to be less than 0.1 ms based on the input time interval being less than the time interval threshold. The processor 130 may determine the input lag allowance time to be 0.1 ms based on the input time interval not being less than the time interval threshold.

A method for obtaining the input lag allowance time of the content may be implemented through a rule-based model. However, embodiments are not limited thereto, and the method for obtaining the input lag allowance time of the content may be implemented through a neural network model. For example, the electronic apparatus 100 may further include a memory which stores a neural network model, and the processor 130 may input the content, the metadata, and the pattern of the user command and obtain the input lag allowance time of the content from the neural network model. Herein, the neural network model may be a model which has trained a plurality of sample contents, a plurality of sample metadata corresponding to the plurality of sample contents, and a relationship between a pattern of a plurality of sample user commands and an input lag allowance time of the plurality of sample contents. In addition, although the method for obtaining the input lag allowance time of the content is implemented as the rule-based model, it may be changed according to a user command. For example, when the input lag allowance time is obtained based on the image content of the content, the metadata, the pattern of the user command, and the like, and there is an image quality improvement command or a low-latency command of a user, after the image processing is performed on the content according to the obtained input lag allowance time, the processor 130 may update the rule-based model based on the image quality improvement command or the low-latency command.

The processor 130 may be configured to perform a plurality of image processing methods to improve image quality. Each of the plurality of image processing methods may affect an image processing time. The processor 130 may selectively active and deactivate each of the plurality of image processing methods. The processor 130 may identify at least one image processing method among the plurality of image processing methods based on the input lag allowance time and perform the image processing on the content based on the at least one image processing method.

For example, the processor 130 may identify at least one image processing method among the plurality of image processing methods based on manipulation time of the user interface 120, communication time between the electronic apparatus 100 and the server 200, decoding time of the content, display output time and the input lag allowance time. For example, the processor 130 may identify whether the combined manipulation time, communication time, decoding time and display output time exceed the input lag allowance time.

Herein, the plurality of image processing methods may include at least one of definition improvement, noise reduction, contrast ratio improvement, frame rate improvement or color processing. However, embodiments are not limited thereto, and the image processing methods may include other methods capable of improving quality of the content.

The plurality of image processing methods may be associated with a plurality of priorities, respectively. The processor 130 may identify at least one image processing method based on at least one of the plurality of priorities or estimated processing time of each of the plurality of image processing methods. For example, the contrast ratio improvement and the color processing may be a first priority, the noise reduction may be a second priority, the definition improvement may be a third priority, and the frame rate improvement may be a fourth priority. If there is no time restriction, the processor 130 may perform both the contrast ratio improvement and the color processing which are the same priority, and if there is time restriction, the processor may perform only one of the contrast ratio improvement and the color processing. However, embodiments are not limited thereto, and the priorities may be differently set and may be changed by the user, for example through the user interface 120. In addition, the processor 130 may apply the image processing method of the lower priority to the content based on the estimated processing time of each of the plurality of image processing methods. For example, if it is identified that the time is not enough to apply the image processing method of the first priority to the content, but there is time for applying the image processing method of the second priority, which is lower than the first priority, to the content, the processor 130 may apply only the image processing method of the second priority to the content.

The plurality of image processing methods described above may be implemented using software, hardware or a combination thereof. For example, the processor 130 may include (i.e., implement) at least one of a definition improvement module, a noise reduction module, a contrast ratio improvement module, a frame rate improvement module, or a color processing module, and perform the image processing on the content using at least one module corresponding to the at least one image processing method. However, embodiments are not limited thereto, and the definition improvement module, the noise reduction module, the contrast ratio improvement module, the frame rate improvement module, or the color processing module may be implemented as hardware separate from the processor 130.

The content may include different scenes with different characteristics. The processor 130 may obtain the input lag allowance time for each scene of the content, identify at least one image processing method among the plurality of image processing methods for each scene based on the input lag allowance time for each scene, and perform the image processing on the corresponding scene based on the at least one identified image processing method. For example, first and second scenes of the content may be processed in different manners. For example, the processor 130 may identify when the first scene changes to the second scene, obtain an input lag allowance time for the second scene, and determine a new set of image processing methods for the second scene.

However, embodiments are not limited thereto, and the processor 130 may obtain the input lag allowance time at predetermined time intervals. Alternatively, in a case where an encoded content is received from the server 200, the processor 130 may obtain the input lag allowance time for each type of an encoded frame. For example, when an intraframe is identified, the processor 130 may obtain the input lag allowance time, and when an interframe is identified, the processor may use the input lag allowance time previously obtained with respect to the intraframe.

The processor 130 may operation in different modes, and different image processing methods may be performed by the processor 130 based on a current mode. When a mode of the electronic apparatus 100 is a first mode, the processor 130 may perform the image processing on the content based on each of the plurality of image processing methods. When the mode of the electronic apparatus 100 is a second mode, the processor may perform the image processing on the content based on at least one image processing method. When the mode of the electronic apparatus 100 is a third mode, the processor may not perform the image processing on the content.

For example, the first mode may be a state where an input lag reduction function is turned off, the second mode may be a state where the input lag reduction function is automatic, the third mode may be a state where the input lag reduction function is turned on, and here, the input lag reduction function may be determined by a user command.

The content may be an encoded content, and the processor 130 may receive the encoded content and metadata corresponding to the encoded content from the server 200 through the communication interface 110, decode the encoded content, and obtain an input lag allowance time of the decoded content based on at least one of image information of the decoded content, the metadata, or a pattern of a user command.

Figure 4:
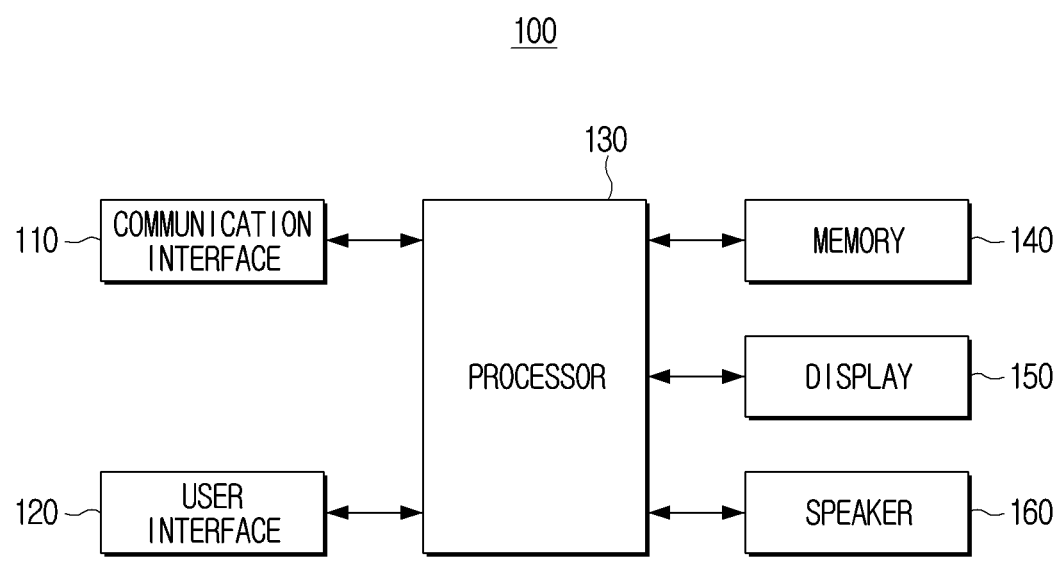

FIG. 4 is a block diagram illustrating a specific configuration of the electronic apparatus 100 according to an embodiment. The electronic apparatus 100 may include the communication interface 110, the user interface 120, and the processor 130. In addition, referring to FIG. 4, the electronic apparatus 100 may further include a memory 140, a display 150, and a speaker 160. The detailed description of the constituent elements illustrated in FIG. 4 which are overlapped with the constituent elements illustrated in FIG. 3 will not be repeated.

The memory 140 may refer to hardware which stores information such as data in an electric or magnetic form so that the processor 130 and the like can access. For this, the memory 140 may be implemented at least one of a non-volatile memory, a volatile memory, a flash memory, a hard disk drive (HDD), a solid-state drive (SSD), a RAM, a ROM, and the like.

The memory 140 may store at least one instruction or module necessary for the operation of the electronic apparatus 100 or the processor 130. Here, the instruction may be a code unit for instructing an operation of the electronic apparatus 100 or the processor 130, and may be written in machine language which is a language that the computer is able to understand. The module may be an instruction set for performing a specific operation in an operation unit.

The memory 140 may store data which is information in units of bits or bytes that can represent text, numbers, images, and the like. For example, the memory 140 may store a content and metadata corresponding to the content. For example, the memory 140 may store a priority database indicating the plurality of priorities corresponding to the plurality of image processing functions. In addition, the memory 140 may store a plurality of image processing modules, an image processing module, an input lag allowance time obtaining module, and the like. Here, the input lag allowance time obtaining module may be implemented as a rule-based model and may be implemented as a neural network model.

The memory 140 may be accessed by the processor 130 and reading, recording, editing, deleting, or updating of the instruction, the module, or data by the processor 130 may be executed.

Functions related to the artificial intelligence according to the disclosure may be operated through the processor 130 and the memory 140.

The processor 130 may be configured with one processor or a plurality of processors (i.e., one or more processors). The one or more processors may include a general-purpose processor such as a CPU, an AP, or a digital signal processor (DSP), a graphic dedicated processor such as a GPU or a vision processing unit (VPU), or a dedicated artificial intelligence processor such as an NPU, or the like.

The one or more processors may perform control to process the input data according to a predefined action rule stored in the memory or an artificial intelligence model. In addition, if the one or more processors include a dedicated artificial intelligence processor, the dedicated artificial intelligence processor may be designed to have a hardware structure specialized in processing of a specific artificial intelligence model. The predefined action rule or the artificial intelligence model is formed through training.

Being formed through training herein may, for example, indicate that a predefined action rule or an artificial intelligence model set to perform a desired feature (or object) is formed by training a basic artificial intelligence model using a plurality of pieces of learning data by a learning algorithm. Such training may be performed in a device demonstrating artificial intelligence according to the disclosure or performed by a separate server and/or system. Examples of the learning algorithm include supervised learning, unsupervised learning, semi-supervised learning, or reinforcement learning, but embodiments are not limited to these examples.

The artificial intelligence model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process.

The artificial neural network may include deep neural network (DNN), and, for example, include a convolutional neural network (CNN), deep neural network (DNN), recurrent neural network (RNN), restricted Boltzmann machine (RBM), deep belief network (DBN), bidirectional recurrent deep neural network (BRDNN), or deep Q-network, but embodiments are not limited to these examples.

The display 150 may be implemented as various types of displays such as liquid crystal display (LCD), organic light emitting diodes (OLED) display, plasma display panel (PDP), and the like. The display 150 may also include a driving circuit or a backlight unit which may be implemented in a form of an amorphous silicon (a-Si) thin-film transistor (TFT), a low temperature poly silicon (LTPS) TFT, or an organic TFT (OTFT). The display 150 may be implemented as a touch screen combined with a touch sensor, a flexible display, a 3D display, or the like.

The speaker 160 is a constituent element which outputs not only various audio data processed in the processor 130, but also various alerts or voice messages.

As described above, the electronic apparatus 100 may provide optimal image quality while reducing input lag, by adaptively applying at least one image processing method of the plurality of image processing methods to the content.

Hereinafter, the operation of the electronic apparatus 100 will be described in more detail with reference to FIGS. 5 to 9. FIGS. 5 to 9 describe individual embodiments for convenience of description. The individual embodiments of FIGS. 5 to 9 may be practiced in a combined manner.

Figure 5:
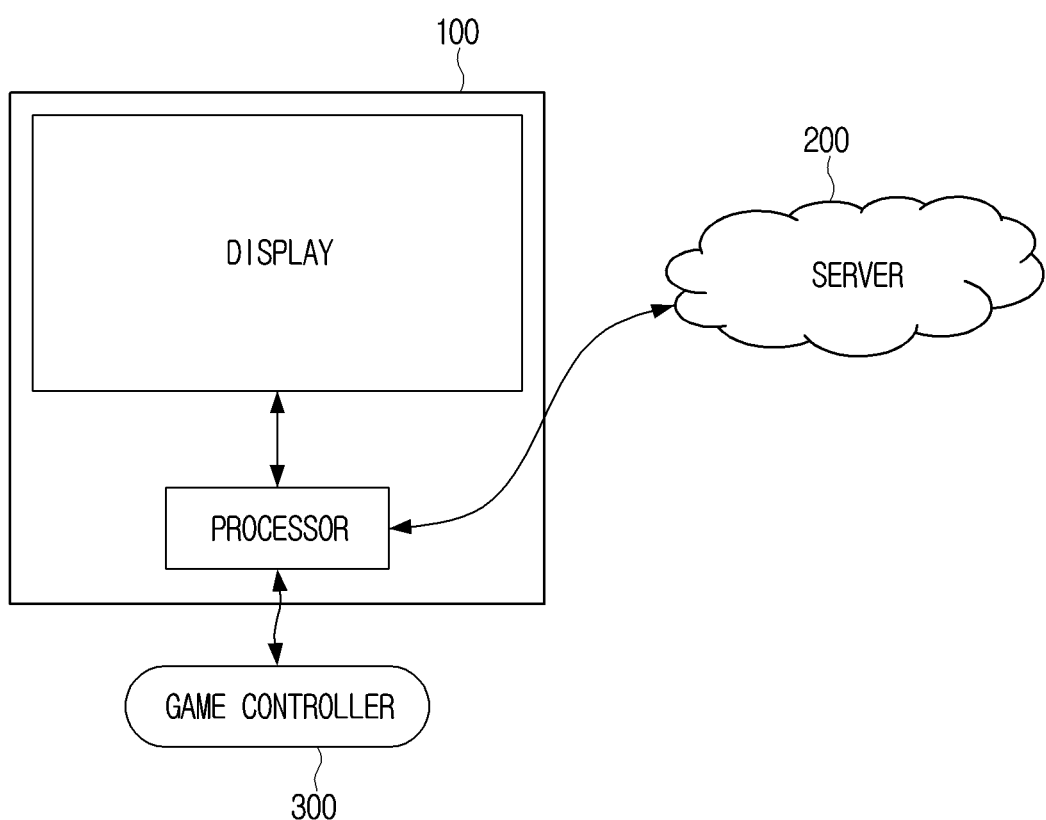
FIG. 5 is a diagram illustrating a cloud server-based game service according to an embodiment.

FIG. 5 is a diagram illustrating a cloud server-based game service according to an embodiment.

The cloud server-based game service may be a service which performs an operation of game execution and graphic generation and performs compression and streaming of a game scene on a server and performs decoding of the game scene and image processing on a processor. In addition, when a user command is input through a game controller 300, the processor may transmit the user command to the server.

Here, the electronic apparatus 100 may be implemented to include the display and the processor of FIG. 5. The game controller 300 may be communicably coupled to the electronic apparatus 100 via the user interface 120. In addition, the electronic apparatus 100 may be an apparatus which is implemented to include only the processor of FIG. 5, and may transmit the image-processed content to an external display. As illustrated in FIG. 5, the electronic apparatus 100 may be implemented as one apparatus together with the display, but embodiments are not limited thereto, and the electronic apparatus 100 may be implemented as an apparatus separate from the display (i.e., as an external display). In this regard, the electronic apparatus 100 may include a display interface to connect the electronic apparatus 100 to the external display.

The electronic apparatus 100 may operate in a plurality of image quality processing modes. For example, the electronic apparatus 100 may operate in a normal image quality processing mode, an automatic image quality processing or a low latency image quality processing mode. When the electronic apparatus 100 operation in the automatic image quality processing mode, the electronic apparatus may perform image processing on a game scene based on at least one image processing method of the plurality of image processing methods and may adaptively change which of the image processing methods are used, thereby providing optimal image quality and minimizing the input lag.

Figure 6:
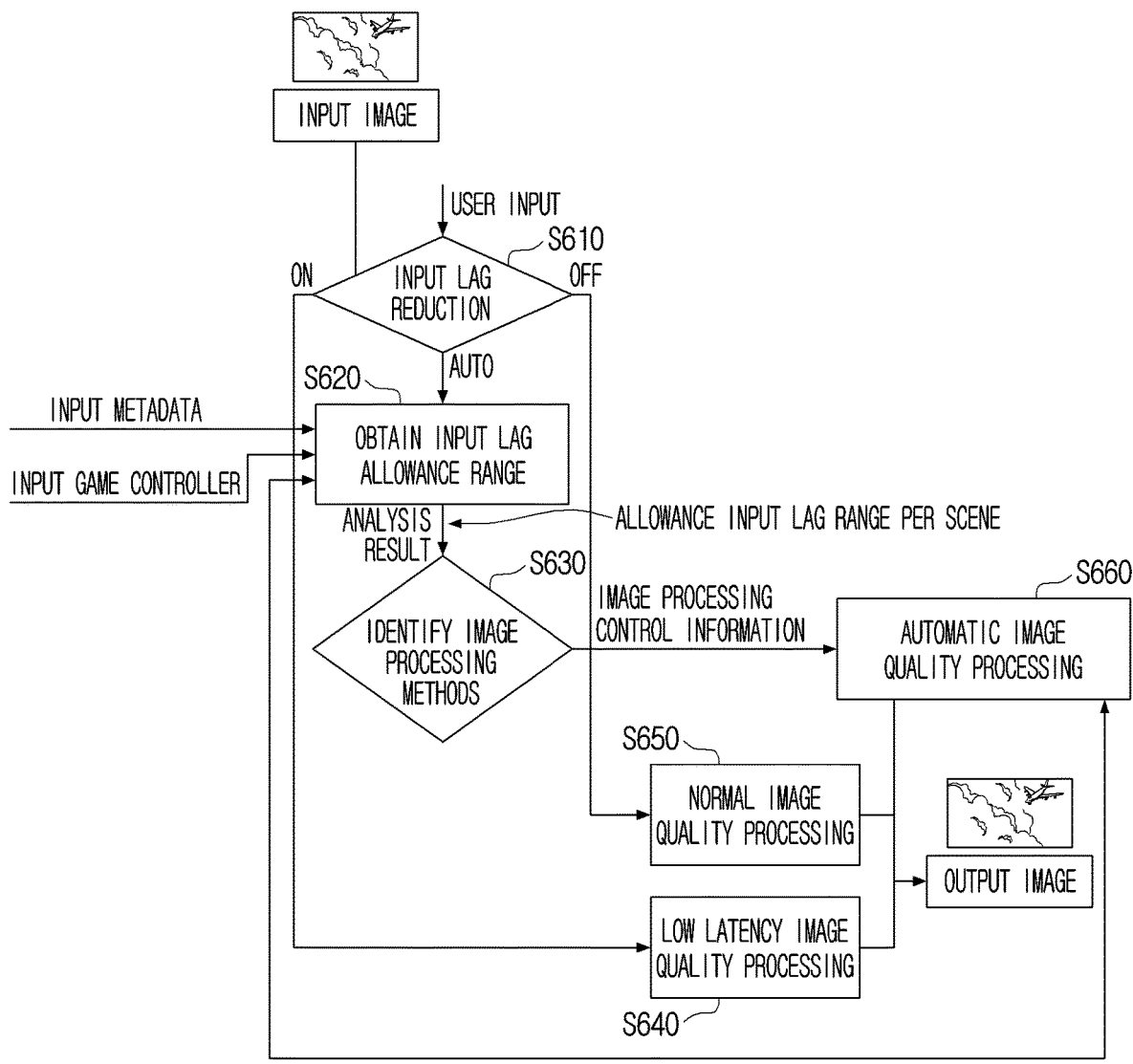
FIG. 6 is a diagram illustrating a method for controlling an electronic apparatus according to an embodiment.

FIG. 6 is a diagram illustrating a method for controlling an electronic apparatus according to an embodiment.

The electronic apparatus 100 may operate in a plurality of modes based on the user command for the input reduction. For example, as illustrated in FIG. 6, in operation S610 the electronic apparatus 100 may receive a user input indicating an image quality processing mode. The electronic apparatus 100 may operate in a normal image quality processing mode according to a user command for turning the input lag reduction function on, operate in an automatic image quality processing mode according to a user command for maintaining the input lag reduction function in an automatic state, and operate in a low latency image quality processing mode according to a user command for turning the input lag reduction function off.

If the user input indicates the input lag reduction is off in operation S610, the electronic apparatus 100 may perform the image processing on the game scene based on the plurality of image processing methods to generate the output image in the normal image quality processing in operation S650. In this case, the image quality of the game scene may be improved, but the input lag may also increase.

If the user input indicates the input lag reduction is on in operation S610, the electronic apparatus 100 may not perform the image processing on the game scene to generate the output image in the low latency image quality processing in operation S640. However, embodiments are not limited thereto, and the electronic apparatus 100 may perform the image minimal image processing methods among the plurality of image processing methods in the low latency image quality processing in operation S640. In this case, the input lag may be reduced, but the image quality of the game scene may also decrease.

If the user input indicates the input lag reduction is auto in operation S610, the electronic apparatus 100 may perform the image processing on the game scene based on at least one image processing method of the plurality of image processing methods to generate the output image in the automatic image quality processing in operation S660. Here, the electronic apparatus 100 may obtain the input lag allowance time in operation S620 based on the input image, input metadata and game controller inputs to identify at least one image processing method to be applied to the game scene. That is, the electronic apparatus 100 may adaptively identify at least one image processing method to be applied to the game scene based on the input lag allowance time, and the operation thereof may be different from the low latency image quality processing mode in which the image processing is not performed and only the predetermined minimum image processing method is applied.

The operation S620 of obtaining the input lag allowance range will be described in more detail below with reference to FIG. 7 through the following drawing.

Figure 7:
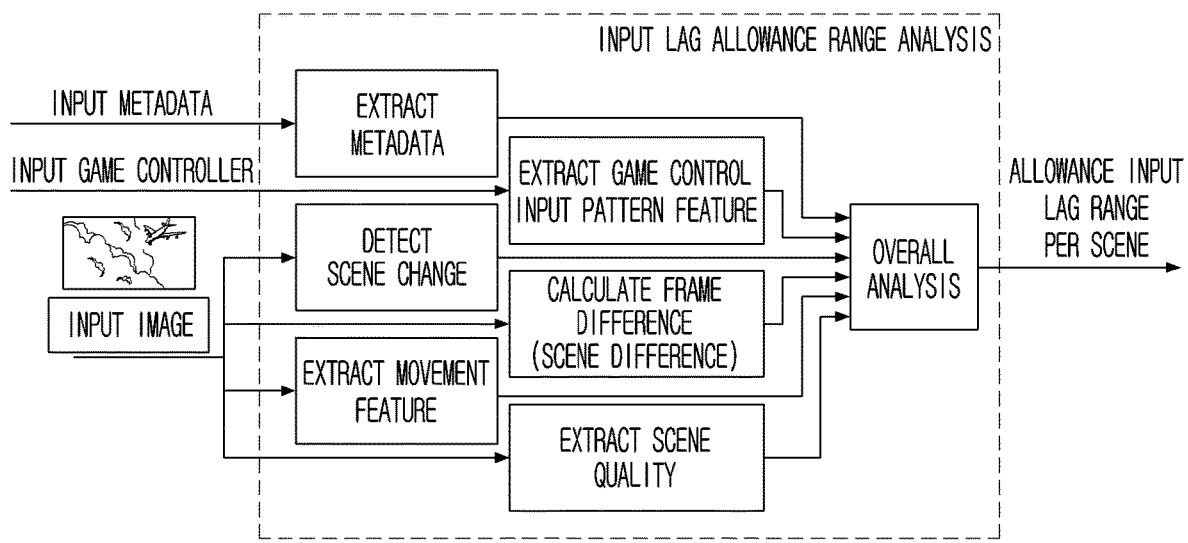
FIG. 7 is a diagram illustrating an input lag allowance time according to an embodiment.

FIG. 7 is a diagram illustrating the operation S620 according to an embodiment. For example, the operation S620 may be performed by an input lag allowance range analyzer implemented by the processor 130.

In operation S620, the processor 130 may obtain the input lag allowance time, for example on a per scene basis, of the content based on at least one of the image information of the content, metadata, or the pattern of the user command received through the user interface 120. Here, the image information may include at least one of scene change information of the content, scene difference information, scene image quality information, or motion information of the object included in the content.

For example, in operation S620 the processor 130 may set the input lag allowance time shorter in a case of the movement feature extraction result indicating a scene with a lot of movement, compared to a case of a scene with less movement. In addition, the processor 130 may set the input lag allowance time shorter in a case where the number of times of input of the user command is large, compared to a case where the number thereof is small. Although only the movement feature is discussed, other elements shown in FIG. 7 may operate in a similar manner.

The input lag allowance range analyzer is an example, and embodiments are not limited thereto. For example, the operation S620 may be performed using a neural network model.

In addition, the processor 130 may receive feedback of the user command after the image processing and update the input lag allowance range analyzer. For example, when the input lag allowance time is obtained as 0.1 ms based on a scene of a current content and a low latency request is received from the user, the processor 130 may obtain the input lag allowance time shorter than 0.1 ms, even if the same scene as the scene of the current content is input subsequently.

Figure 8:
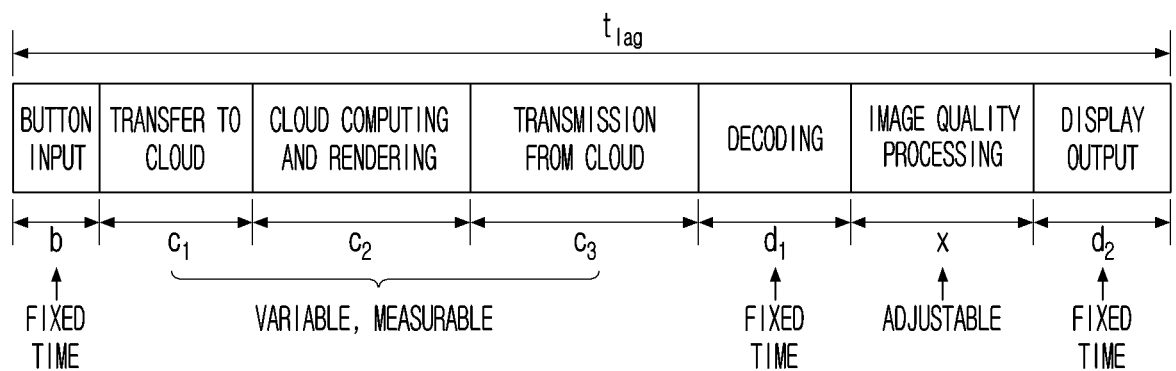
FIG. 8 is a diagram illustrating an input lag according to an embodiment.

FIG. 8 is a diagram illustrating an input lag according to an embodiment.

Referring to FIG. 8, the input lag $t_{lag}$ may include a button input time b, transfer to cloud time $c_1$, cloud computing and rendering time $c_2$, transmission from cloud time $c_3$, decoding time $d_1$, image quality processing time x, and display output time $d_2$.

Herein, the button input time b, the decoding time $d_1$, and the display output time $d_2$ are fixed times, and the transfer to cloud time $c_1$, the cloud computing and rendering time $c_2$, and the transmission from cloud time $c_3$ are variable but may be measured. In addition, the image quality processing x is adjustable time.

That is, the processor 130 may perform the image quality during the image quality processing time x, which is the time of the input lag $t_{lag}$ that excludes the button input b, the transfer to cloud $c_1$, the cloud computing and rendering $c_2$, the transmission from cloud $c_3$, the decoding $d_1$, and the display output time $d_2$ from the input lag.

In the related art, in a case of operating in the normal image quality processing mode, all image processing methods are applied to the content, and in a case of operating in the low latency image quality processing mode, the minimum image processing method is only applied to the content and the image quality processing time is determined accordingly.

On the other hand, the processor 130 according to embodiments may determine the image quality processing time first and determine the image processing method applied to the content accordingly, thereby providing optimal image quality without significantly increasing the input lag. In addition, the processor 130 may perform more adaptive image processing, since there are various methods for applying the image processing method to the content based on the image quality processing time.

Figure 9:
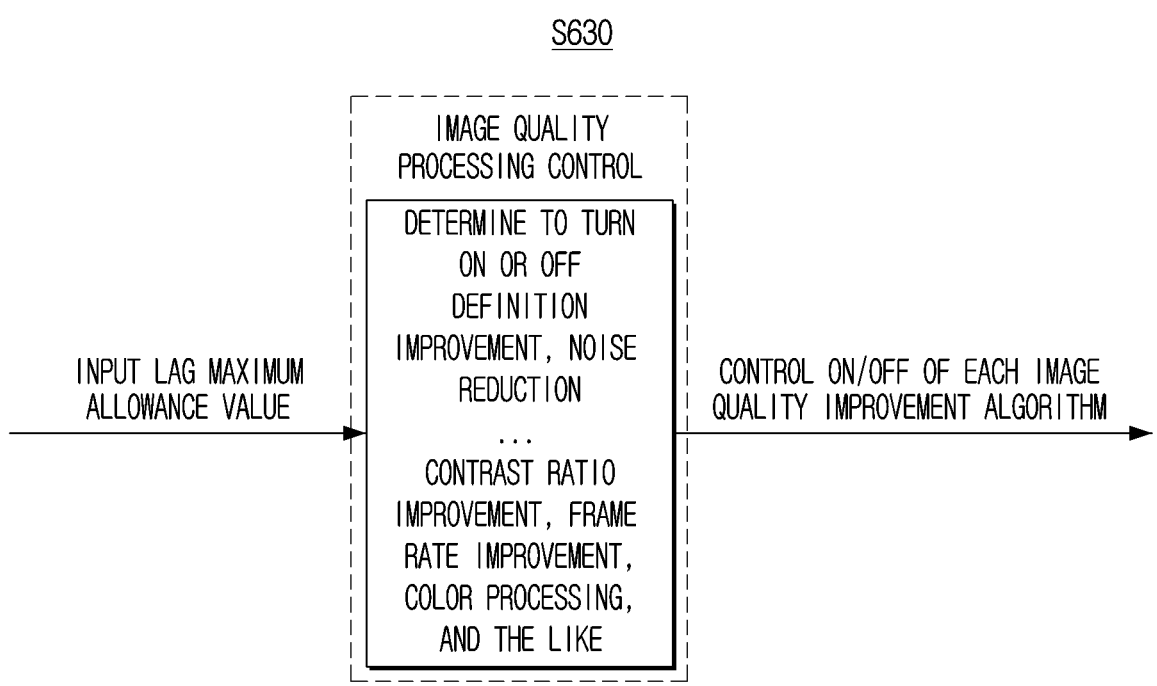
FIG. 9 is a diagram illustrating image processing according to an embodiment.

FIG. 9 is a diagram illustrating the operation S630 according to an embodiment. For example, the operation S630 may be performed by an image quality processor controller implemented by the processor 130.

The processor 130 may identify at least one image processing method among a plurality of image processing methods based on the input lag allowance time and may perform the image processing on the content based on the at least one image processing method. Herein, the plurality of image processing methods may include at least one of definition improvement, noise reduction, contrast ratio improvement, frame rate improvement, or color processing.

The plurality of image processing methods may be implemented as software. Alternatively, each of the plurality of image processing methods may be implemented as one hardware module. Alternatively, some of the plurality of image processing methods may be implemented as hardware modules and others may be implemented as software.

The processor 130 may identify at least one image processing method to be applied to the content based on at least one of a priority between the plurality of image processing methods or estimated processing time of each of the plurality of image processing methods.

However, embodiments are not limited thereto, and the processor 130 may identify at least one image processing method to be applied to the content based on an analysis result of the content. For example, when a resolution of the content is a predetermined resolution or less, the processor 130 may apply definition improvement to the content first, although the contrast ratio improvement and the color processing are the first priority.

FIG. 10 is a diagram illustrating a method for controlling an electronic apparatus according to an embodiment.

Content and metadata corresponding to the content are received from a server in operation S1010. An input lag allowance time of the content is obtained based on at least one of image information of the content, the metadata, and a pattern of a user command in operation S1020. At least one image processing method is identified among a plurality of image processing methods based on the input lag allowance time in operation S1030. The image processing is performed on the content based on the at least one image processing method in operation S1040.

Herein, the identifying in operation S1030 may include identifying at least one image processing method among the plurality of image processing methods based on an input lag allowance time, and a manipulation time of a user interface included in the electronic apparatus, a communication time between the electronic apparatus and the server, a decoding time of the content, and a display output time.

The identifying in operation S1030 may include identifying at least one image processing method based on at least one of a priority between the plurality of image processing methods and estimated processing time of each of the plurality of image processing methods.

The image information may include scene change information, scene difference information, scene quality information of the content, or motion information of an object included in the content.

The obtaining in operation S1020 may include obtaining input lag allowance time per scene of the content, the identifying in operation S1030 may include identifying at least one image processing method among the plurality of image processing methods per scene based on the input lag allowance time per scene, and the processing in operation S1040 may include performing image processing on the corresponding scene based on the at least one identified image processing method.

The obtaining in operation S1020 may include obtaining the input lag allowance time of the content by inputting the content, the metadata, and the pattern of the user command to a neural network model, and the neural network model may be a model which has trained a plurality of sample contents, a plurality of sample metadata corresponding to the plurality of sample contents, and a relationship between a pattern of a plurality of sample user commands and an input lag allowance time of the plurality of sample contents.

In the processing in operation S1040, when the mode of the electronic apparatus is a first mode, the image processing may be performed on the content based on the plurality of image processing methods, when the mode of the electronic apparatus is a second mode, the image processing may be performed on the content based on at least one image processing method, and when the mode of the electronic apparatus is a third mode, the image processing may not be performed on the content.

The content is an encoded content, and the receiving in operation S1010 may include receiving the encoded content and metadata corresponding to the encoded content from the server, the control method may further include decoding the encoded content, and the obtaining in operation S1030 may include obtaining an input lag allowance time of the decoded content based on at least one of image information of the decoded content, the metadata, or a pattern of a user command.

The plurality of image processing methods may include at least one of definition improvement, noise reduction, contrast ratio improvement, frame rate improvement or color processing.

According to various embodiments of the disclosure, the electronic apparatus may obtain the input lag allowance time and apply at least one image processing method of the plurality of image processing methods to the content based on the input lag allowance time, thereby providing optimal image quality while minimizing user's inconvenience due to the input lag.

In addition, the electronic apparatus may identify at least one image processing method in consideration of the data transmission and reception time with the server, thereby providing optimal image quality while minimizing user's inconvenience due to the input lag even in a cloud game service.

According to an embodiment of the disclosure, various embodiments of the disclosure may be implemented as software including instructions stored in machine (e.g., computer)-readable storage media. The machine is an apparatus which invokes instructions stored in the storage medium and is operated according to the invoked instructions, and may include an electronic apparatus (e.g., electronic apparatus A) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment of the disclosure, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

In addition, according to an embodiment of the disclosure, various embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above. The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While aspects of embodiments have been particularly shown and described, it will be understood that various changes in form and details may be made therein without departing from the spirit and scope of the following claims.

What is claimed is:

1. An electronic apparatus comprising:
   a communication interface;
   a user interface; and
   a processor configured to control the electronic apparatus to:
   receive a content and metadata corresponding to the content from a server through the communication interface;
   obtain an input lag allowance time corresponding to the content based on any one or any combination of image information corresponding to the content, the metadata, or a pattern of a user command received through the user interface;
   identify a response time;
   identify at least one image processing method, among a plurality of image processing methods, based on the input lag allowance time and the response time; and
   perform image processing on the content based on the at least one image processing method.

2. The electronic apparatus according to claim 1, wherein the processor is further configured to identify the at least one image processing method based on whether the input lag allowance time is exceeded by the response time, and the response time corresponds to a combination of a manipulation time of the user interface, a communication time between the electronic apparatus and the server, a decoding time of the content, and a display output time.

3. The electronic apparatus according to claim 2, wherein the processor is further configured to identify the at least one image processing method based on a plurality of priorities corresponding to the plurality of image processing methods, respectively, or an estimated processing time of each of the plurality of image processing methods.

4. The electronic apparatus according to claim 1, wherein the image information comprises any one or any combination of scene change information of the content, scene difference information, scene quality information, or motion information of an object included in the content.

5. The electronic apparatus according to claim 1, wherein the processor is further configured to:
   obtain a plurality of input lag allowance times for each of a plurality of scenes of the content, respectively;
   identify at least one image processing method among the plurality of image processing methods for each of the plurality of scenes, respectively, based on a corresponding input lag allowance time among the plurality of input lag allowance times; and
   perform image processing on each of the plurality of scenes based on a corresponding at least one identified image processing method.

6. The electronic apparatus according to claim 1, further comprising a memory storing a neural network model,
   wherein the processor is further configured to obtain the input lag allowance time of the content by inputting the content, the metadata, and the pattern of the user command to the neural network model, and
   wherein the neural network model is a model trained based on a plurality of sample contents, a plurality of sample metadata corresponding to the plurality of sample contents, and a relationship between a sample pattern of a plurality of sample user commands and a plurality of input lag allowance times corresponding to the plurality of sample contents.

7. The electronic apparatus according to claim 1, wherein the processor is further configured to:
   based on a mode of the electronic apparatus being a first mode, perform image processing on the content based on each of the plurality of image processing methods;
   based on the mode of the electronic apparatus being a second mode, perform the image processing on the content based on the at least one image processing method; and
   based on the mode of the electronic apparatus being a third mode, not perform the image processing on the content.

8. The electronic apparatus according to claim 1, wherein the content is an encoded content, and
   wherein the processor is further configured to:
   decode the encoded content; and
   obtain the input lag allowance time of the decoded content based on a decoding time and any one or any combination of the image information corresponding to the content, the metadata, or the pattern of the user command.

9. The electronic apparatus according to claim 1, wherein the processor further is configured to:
   implement at least one module comprising any one or any combination of a definition improvement module, a noise reduction module, a contrast ratio improvement module, a frame rate improvement module, or a color processing module; and
   perform the image processing on the content using the at least one module.

10. The electronic apparatus according to claim 1, wherein the plurality of image processing methods comprises any one or any combination of definition improvement, noise reduction, contrast ratio improvement, frame rate improvement, or color processing.

11. The electronic apparatus according to claim 1, wherein the pattern of the user command comprises any one or any combination of an input time interval of the user command or a type of the user command.

12. A method for controlling an electronic apparatus, the method comprising:

receiving a content and metadata corresponding to the content from a server;

obtaining an input lag allowance time corresponding to the content based on any one or any combination of image information corresponding to the content, the metadata, or a pattern of a user command;

identifying a response time identifying at least one image processing method, among a plurality of image processing methods, based on the input lag allowance time and the response time; and performing image processing on the content based on the at least one image processing method.

13. The method according to claim 12, wherein the identifying comprises identifying the at least one image processing method based on whether the input lag allowance time is exceeded by the response time, and the response time corresponds to a combination of a manipulation time of a user interface included in the electronic apparatus, a communication time between the electronic apparatus and the server, a decoding time of the content, and a display output time.

14. The method according to claim 13, wherein the identifying comprising identifying the at least one image processing method based on a plurality of priorities corresponding to the plurality of image processing methods, respectively, or an estimated processing time of each of the plurality of image processing methods.

15. The method according to claim 12, wherein the image information comprises any one or any combination of scene change information of the content, scene difference information, scene quality information, or motion information of an object included in the content.

16. A non-transitory computer readable storage medium having instructions stored thereon which, when executed by a processor of a display device including a communication interface and a user interface, cause the display device to:

receive a content and metadata corresponding to the content from a server through the communication interface;

obtain an input lag allowance time corresponding to the content based on any one or any combination of image information corresponding to the content, the metadata, or a pattern of a user command received through the user interface;

identify a response time;

identify at least one image processing method, among a plurality of image processing methods, based on the input lag allowance time and the response time; and perform image processing on the content based on the at least one image processing method.

17. A display device comprising:
a display panel;
a communication interface; and
a processor configured to:
receive content through the communication interface;
obtain an input lag allowance time corresponding to the content;
identify a response time;
identify at least one image processing method, among a plurality of image processing methods, based on the input lag allowance time and the response time;
perform image processing on the content based on the at least one image processing method to obtain processed image data; and
control the display panel based on the processed image data.

18. The display device according to claim 17, wherein an image processing method, among the plurality of image processing methods, is excluded from the at least one image processing method.

19. The display device according to claim 17, wherein a number of the at least one image processing method is less than a number of the plurality of image processing methods.

20. The display device according to claim 17, further comprising a user interface configured to receive input,
wherein the processor is further configured to:
identify a pattern of the input received through the user interface; and
obtain the input lag allowance time based on the pattern.

21. The display device according to claim 20, wherein the processor is further configured to obtain the input lag allowance time based on the pattern and metadata corresponding to the content.

22. The display device according to claim 20, wherein the processor is further configured to control the communication interface to transmit commands to an external device based on the input, and
wherein the content received through the communication interface is provided by the external device based on the input.

23. The display device according to claim 22, wherein the response time corresponds to a difference between an input time when a first input is provided to the user interface, and an output time when content corresponding to the first input is displayed as the processed image data.

24. The display device according to claim 23, wherein the external device is a cloud based game server, and the content corresponds to a game provided by the cloud based game server.

* * * * *